(12) United States Patent
Starkovich et al.

(10) Patent No.: US 11,555,949 B2
(45) Date of Patent: *Jan. 17, 2023

(54) HIGH-PERFORMANCE OPTICAL ABSORBER COMPRISING FUNCTIONALIZED, NON-WOVEN, CNT SHEET AND TEXTURIZED POLYMER FILM OR TEXTURIZED POLYMER COATING AND MANUFACTURING METHOD THEREOF

(71) Applicant: Northrop Grumman Systems Corporation, Falls Church, VA (US)

(72) Inventors: John A. Starkovich, Redondo Beach, CA (US); Edward M. Silverman, Encino, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/583,446

(22) Filed: Jan. 25, 2022

(65) Prior Publication Data

US 2022/0206194 A1 Jun. 30, 2022

Related U.S. Application Data

(63) Continuation of application No. 17/412,381, filed on Aug. 26, 2021, now Pat. No. 11,307,331, which is a
(Continued)

(51) Int. Cl.
*G02B 5/00* (2006.01)
*B29D 11/00* (2006.01)
*B33Y 80/00* (2015.01)

(52) U.S. Cl.
CPC .......... *G02B 5/003* (2013.01); *B29D 11/0074* (2013.01); *B33Y 80/00* (2014.12); *G02B 2207/101* (2013.01)

(58) Field of Classification Search
CPC .. G02B 5/003; G02B 2207/101; B33Y 80/00; B29D 11/0074
See application file for complete search history.

(56) References Cited

U.S. PATENT DOCUMENTS 10,584,418 B1  3/2020 Starkovich et al.
11,175,437 B1  11/2021 Starkovich et al.
(Continued)

OTHER PUBLICATIONS

Notification Of Transmittal Of The International Search Report And The Written Opinion Of The International Searching Authority, Or The Declaration issued in related Application Serial No. PCT/US2021/063219, dated Feb. 23, 2022, 15 pages.
(Continued)

*Primary Examiner* — William R Alexander
*Assistant Examiner* — Sharrief I Broome
(74) *Attorney, Agent, or Firm* — McCracken & Gillen LLC (57) ABSTRACT

A high-performance optical absorber, having a texturized base layer, the base layer comprising one or more of a polymer film and a polymer coating; and a surface layer located above and immediately adjacent to the base layer. The surface layer is joined to the base layer and the surface layer has a plasma-functionalized, non-woven carbon nanotube (CNT) sheet, wherein the base layer texturization comprises one or more of substantially rectangular ridges, substantially triangular ridges, substantially pyramidal ridges, and truncated, substantially pyramidal ridges.

12 Claims, 13 Drawing Sheets

Related U.S. Application Data continuation of application No. 17/136,703, filed on Dec. 29, 2020, now Pat. No. 11,175,437.

(56) References Cited

U.S. PATENT DOCUMENTS

| | | | | |
|---|---|---|---|---|
| 2002/0197474 | A1* | 12/2002 | Reynolds | B82Y 40/00 |
| | | | | 428/408 |
| 2006/0273245 | A1* | 12/2006 | Kim | B82Y 20/00 |
| | | | | 250/226 |
| 2008/0063860 | A1* | 3/2008 | Song | B32B 27/08 |
| | | | | 428/408 |
| 2009/0008787 | A1 | 1/2009 | Wenham et al. | |
| 2010/0046750 | A1 | 2/2010 | Asfour | |
| 2011/0051251 | A1* | 3/2011 | Endoh | G02B 1/118 |
| | | | | 430/321 |
| 2011/0157667 | A1 | 6/2011 | Lacoste et al. | |
| 2012/0224062 | A1 | 9/2012 | Lacoste et al. | |
| 2013/0129981 | A1* | 5/2013 | Hiromitsu | G02B 5/223 |
| | | | | 264/1.36 |
| 2018/0201541 | A1 | 7/2018 | March et al. | |
| 2019/0310397 | A1* | 10/2019 | Starkovich | G02B 1/04 |
| 2019/0369305 | A1 | 12/2019 | Carter | |

OTHER PUBLICATIONS

Shah Jayna J. et al, "Capillarity Induced Solvent-Actuated Bonding of Polymeric Microfluidic Devices", Analytical Chemistry, vol. 78, No. 10, May 1, 2006 (May 1, 2006), pp. 3348-3353.

Notification Of Transmittal Of The International Search Report And The Written Opinion Of The International Searching Authority, Or The Declaration issued in related Application Serial No. PCT/US2021/058706, dated Apr. 22, 2022, 21 pages.

Office Action issued in related U.S. Appl. No. 17/947,375, dated Nov. 4, 2022, 12 pages.

\* cited by examiner

HIGH-PERFORMANCE OPTICAL ABSORBER COMPRISING FUNCTIONALIZED, NON-WOVEN, CNT SHEET AND TEXTURIZED POLYMER FILM OR TEXTURIZED POLYMER COATING AND MANUFACTURING METHOD THEREOF

CROSS REFERENCE TO RELATED APPLICATIONS

The present application is a continuation application of U.S. patent application Ser. No. 17/412,381, filed Aug. 26, 2021, entitled "HIGH-PERFORMANCE OPTICAL ABSORBER COMPRISING FUNCTIONALIZED, NON-WOVEN, CNT SHEET AND TEXTURIZED POLYMER FILM OR TEXTURIZED POLYMER COATING AND MANUFACTURING METHOD THEREOF" which is a continuation application of U.S. patent application Ser. No. 17/136,703, filed Dec. 29, 2020, entitled "HIGH-PERFORMANCE OPTICAL ABSORBER COMPRISING FUNCTIONALIZED, NON-WOVEN, CNT SHEET AND TEXTURIZED POLYMER FILM OR TEXTURIZED POLYMER COATING AND MANUFACTURING METHOD THEREOF", the entire contents of which are incorporated herein by reference.

STATEMENT OF GOVERNMENT RIGHTS

The Government of the United States of America has rights in this invention pursuant to Government Contract No. 11-C-0042.

SUMMARY

A high-performance optical absorber, having a texturized base layer, the base layer comprising one or more of a polymer film and a polymer coating; and a surface layer located above and immediately adjacent to the base layer. The surface layer is joined to the base layer and the surface layer has a plasma-functionalized, non-woven carbon nanotube (CNT) sheet, wherein the base layer texturization comprises one or more of substantially rectangular ridges, substantially triangular ridges, substantially pyramidal ridges, and truncated, substantially pyramidal ridges.

DESCRIPTION OF THE DRAWINGS

The accompanying drawings provide visual representations which will be used to more fully describe various representative embodiments and can be used by those skilled in the art to better understand the representative embodiments disclosed herein and their inherent advantages. In these drawings, like reference numerals identify corresponding elements.

DETAILED DESCRIPTION

Embodiments of the invention provide a practical method for producing higher performance optical absorbers comprising a texturized base layer, the base layer comprising one or more of a polymer film and a polymer coating, the optical absorber further comprising a surface layer located above and immediately adjacent to the base layer, the surface layer comprising a plasma-functionalized, non-woven CNT sheet, for use in aerospace instruments as well as for solar energy conversion applications. Embodiments of the invention enhance optical absorbance properties of non-woven carbon nanotube (CNT) materials through creation at a surface of an absorber of one or more of a functionalized layer and a texturized layer. For example, the CNT materials comprise one or more of a non-woven CNT sheet and a CNT film. For example, the plasma comprises oxygen plasma. Plasma functionalization creates an oxygenated dielectric layer on top of the non-woven CNT sheet that is one or more of less refractive and less reflective than the non-woven CNT sheet.

For example, the non-woven CNT sheet comprises one or more of horizontal, randomly-oriented CNT and horizontal, randomly oriented multi-walled CNT (MWCNT) having a porosity between approximately 40% and approximately 90%. Preferably, the one or more of horizontal, randomly-oriented CNT and horizontal, randomly oriented MWCNT has a porosity between approximately 65% and approximately 75%. For example, the one or more of horizontal, randomly-oriented CNT and horizontal, randomly oriented MWCNT has an areal density between approximately 10 grams per square meter ($g/m^2$) and approximately 30 $g/m^2$. Preferably, the one or more of horizontal, randomly-oriented CNT and horizontal, randomly oriented MWCNT has an areal density between approximately 12 $g/m^2$ and approximately 15 $g/m^2$. For example, the CNT sheet is Miralon, manufactured by Nanocomp Technologies, Inc. (www.miralon.com) of Merrimack, N.H.

Texturization of the base layer comprising one or more of a polymer film and a polymer coating introduces a geometric light-trapping structure to the absorber. The combined surface functionalization and texturization treatment creates an optical absorber having a dielectric/conductor structure whose design may be tailored depending on details of the texturization. Texturization of the non-woven CNT sheet is optional but it does enhance the performance of the optical absorber.

Figure 1:
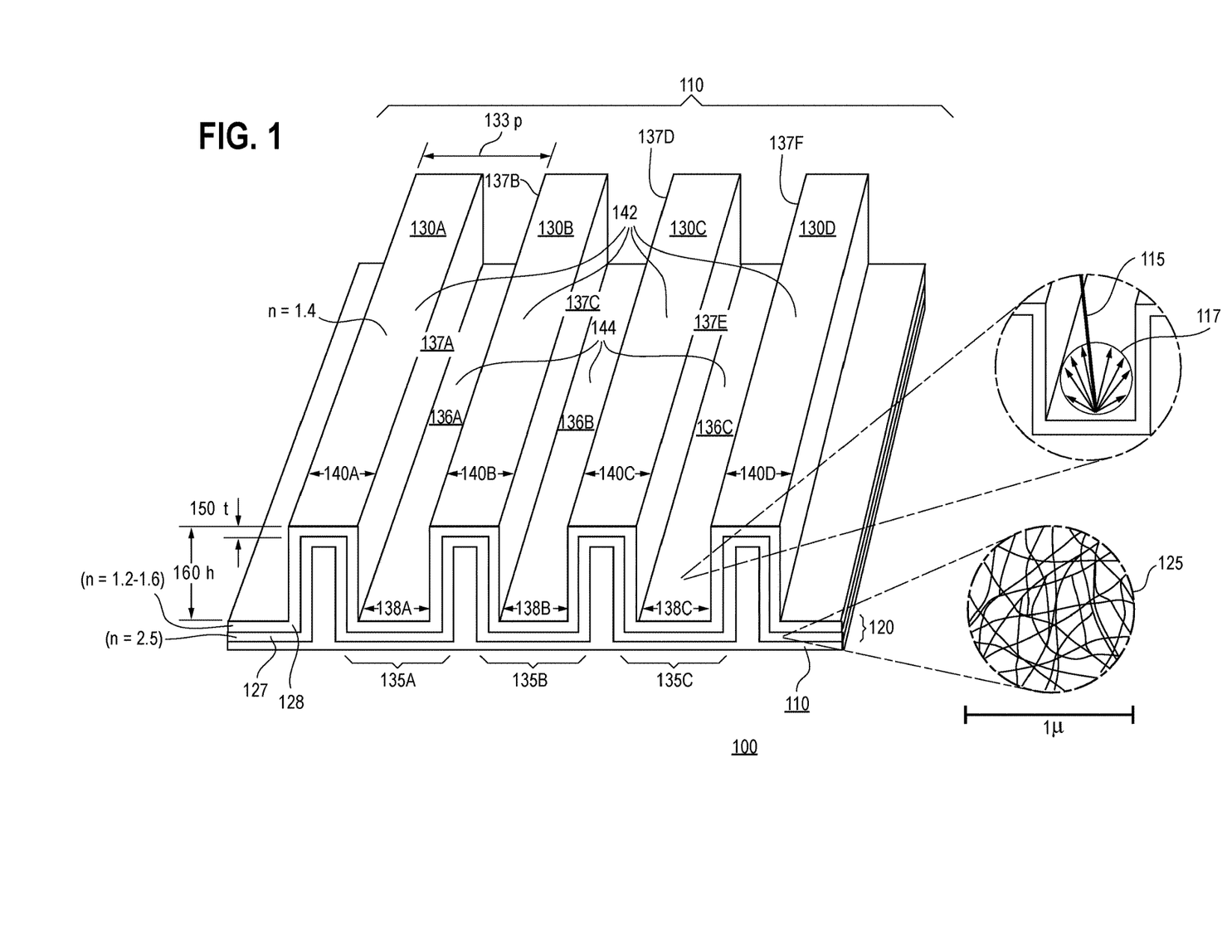
FIG. 1 is a drawing of a high-performance optical absorber comprising a texturized base layer, the base layer comprising one or more of a polymer film and a polymer coating, the optical absorber further comprising a surface layer located above and immediately adjacent to the base layer, the surface layer comprising a plasma-functionalized, non-woven CNT sheet.

FIG. 1 is a drawing of a high-performance optical absorber 100 comprising a base layer 110, the base layer 110 comprising one or more of a polymer film (not explicitly shown) and a polymer coating (not explicitly shown).

The optical absorber 100 further comprises a surface layer 120, the surface layer 120 comprising a non-woven CNT sheet 120 that is plasma-functionalized. The surface layer 120 comprises multi-walled CNTs (MWCNTs) as suggested by a blown up view 125 of a 1 micron cross-section of the surface layer 120. The surface layer 120 comprises a non-functionalized surface sub-layer 127 and also comprises a functionalized surface sub-layer 128. The plasma-functionalized surface sub-layer 128 absorbs a substantial portion of the incident light 115 and reflects a small portion of the incident light 115 via Lambertian reflectance 117, meaning substantially angle-independent uniform reflectance of the incident light 115.

As depicted, the base layer 110 comprises rectangular-groove texturization. As depicted, the base layer 110 comprises rectangular ridges 130A-130D. Successive rectangular ridges 130A-130D are separated from each other by a distance defined as a pitch p 133. Each successive pair of the rectangular ridges 130A-130D form between them a rectangular groove 135A-135C. Rectangular grooves 135A-135C have respective groove widths 137A-137C. The rectangular grooves 135A-135C create respective floors 136A-136C. The rectangular grooves 135A-135C also create respective groove walls 137A-137F. The rectangular ridges 130A-130D each has a respective ridge width 140A-140D approximately equal to the respective groove widths 138A-138C. Accordingly, a top surface area 142 is approximately equal to a floor surface area 144. Therefore the top surface area 142 is approximately equal to half of the top surface area of non-texturized prior art having a similar shape, and therefore the reflectance of the high-performance optical absorber 100 should be reduced to approximately 50% of non-texturized prior art having a similar shape. Exact details of the amount by which reflectance is reduced will depend on an amount of light absorbance by one or more of the groove walls and the floor.

The non-functionalized surface sub-layer 127 has a thickness t 150.

The ridges 130A-130D each has a height h 160 above the surface layer 120. Preferably, although not necessarily, the pitch p 133 is greater than or equal to $10 \times \lambda$, where $\lambda$ is the wavelength of the incident light. Preferably, although not necessarily, the thickness t 150 is greater than or equal to $10 \times \lambda$, where $\lambda$ is the wavelength of the incident light. Preferably, although not necessarily, the height h 160 is greater than or equal to $10 \times \lambda$, where $\lambda$ is the wavelength of the incident light.

An exemplary index of refraction $n_{non-functionalized\ surface\ sub-layer}$ of the non-functionalized surface sub-layer 127 is approximately 2.5. An exemplary index of refraction $n_{functionalized\ surface\ sub-layer}$ of the functionalized surface sub-layer 128 is between approximately 1.2 and approximately 1.6.

FIGS. 2A-2F are a set of six drawings depicting a method for manufacturing a high-performance optical absorber using capillary force lamination (CFL).

Figure 2A:
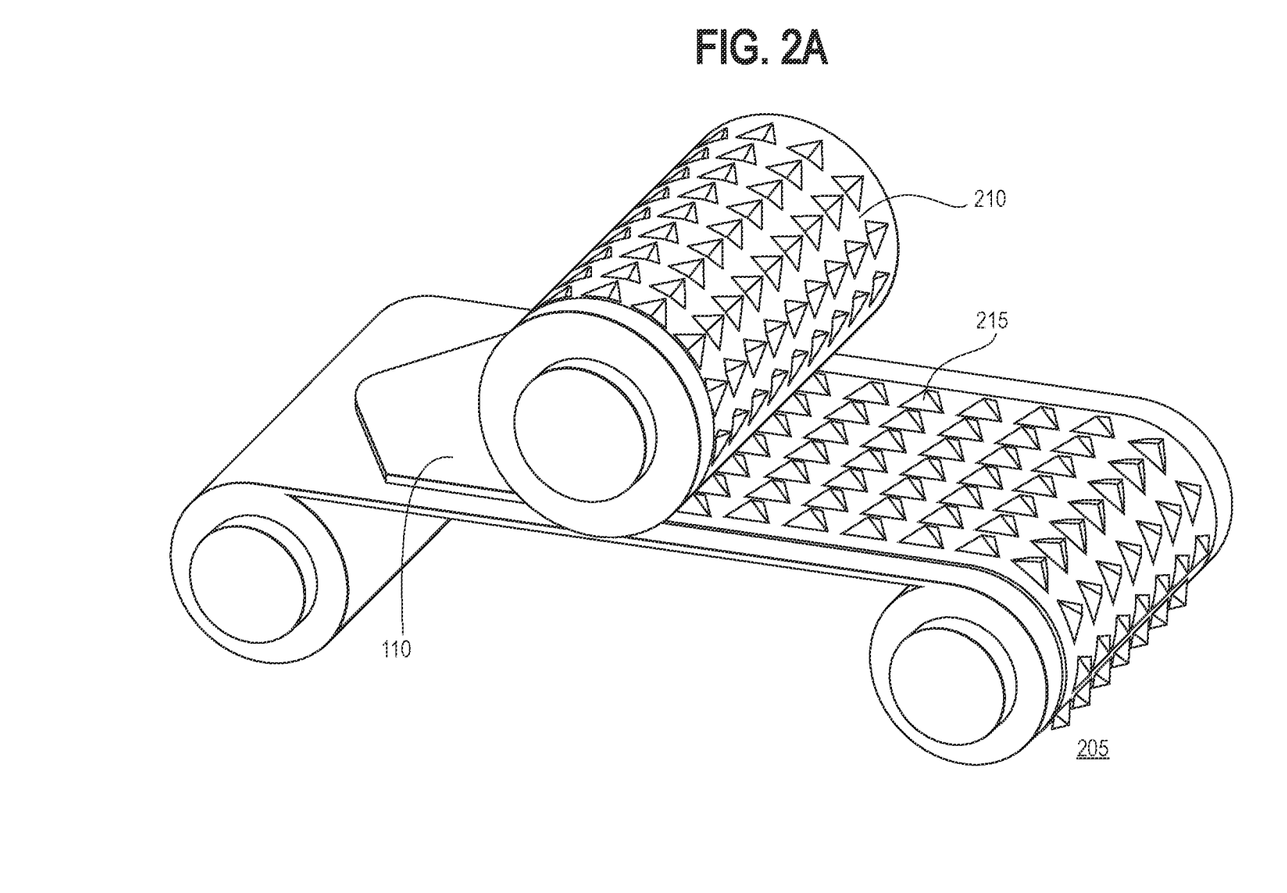
FIGS. 2A-2F are a set of six drawings depicting a method for manufacturing a high-performance optical absorber using capillary force lamination (CFL).
Figure 2B:
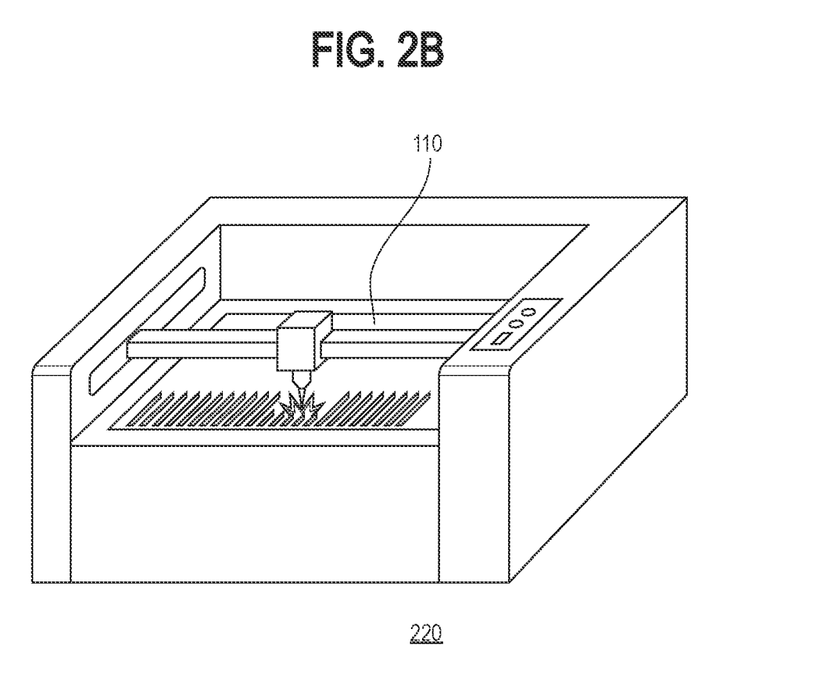

FIGS. 2A-2B are a set of two drawings depicting two different methods to perform the first step in the method for manufacturing the high-performance optical absorber.

FIG. 2A is a drawing depicting a first method using an embosser 205 to perform the first step in the method for manufacturing the high-performance optical absorber (not shown in this figure). The embosser 205 comprises an embossing pattern roll 210 configured to generate a micro-macro feature 215 in the base layer 110. The base layer 110 comprises one or more of a polymer film (not explicitly shown in this figure) and a polymer coating (not explicitly shown in this figure). Alternatively, or additionally, the embosser is also configured to generate a micro-macro feature 215 in the surface layer (not shown in this figure). As depicted, the pattern roll 210 generates a triangular micro/macro feature 215 in the base layer 110. For example, the embosser 205 comprises one or more of a thermal embosser 205 and a mechanical embosser 205.

The illustrated first method uses the embosser 200 for texturizing the base layer 110. As mentioned above, alternatively, or additionally, the embosser 205 can also simultaneously texturize the surface layer (not shown in this figure).

FIG. 2B is a drawing depicting a second method using an engraver 220 to perform the first step in the method for manufacturing the high-performance optical absorber (not shown in this figure). The engraver 220 texturizes the base layer 110.

For example, the engraver 220 comprises a laser engraver 220. For example, the laser engraver 220 comprises one or more of a raster engraver 220 and a vector engraver 220.

Alternatively, or additionally, the same basic procedure outlined in this figure can instead be performed using a three-dimensional (3D) printer 220 instead of an engraver 220.

Figure 2C:
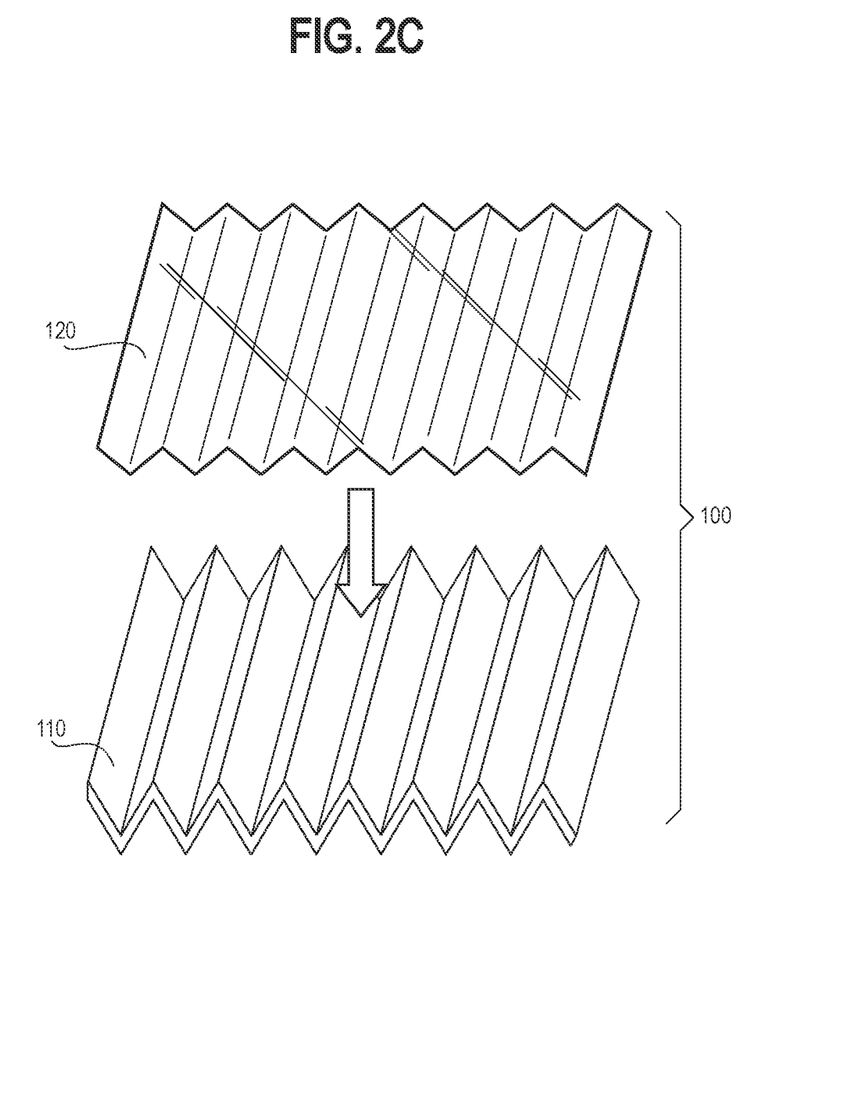

In FIG. 2C, the high-performance optical absorber 100 is created by joining the surface layer 120 comprising the CNT sheet to the base layer 110. For example, and as depicted, the surface layer 120 is laid on top of the base layer 110, creating the optical absorber 100.

Figure 2D:
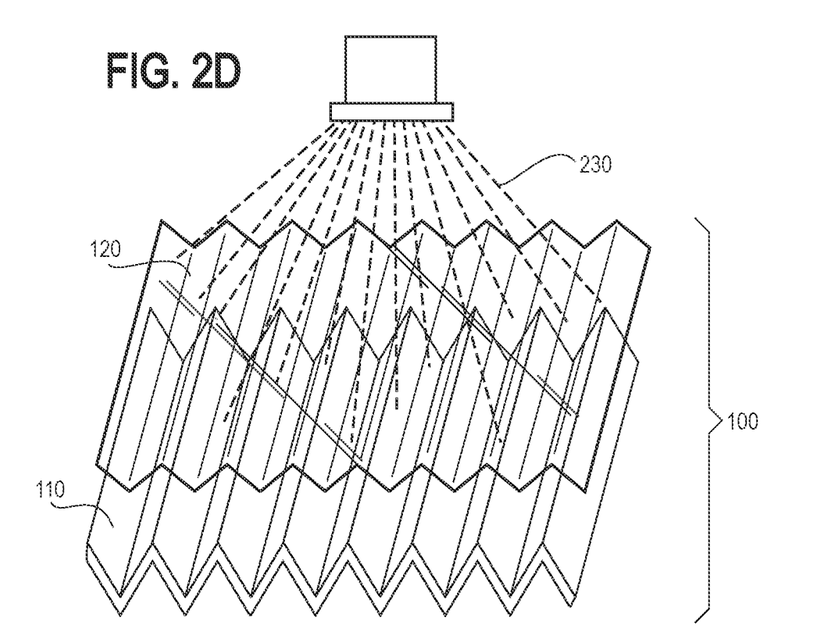

In FIG. 2D, the optical absorber 100 comprising the base layer 110 and the CNT sheet layer 120 is wetted with a solvent 230. For example, the solvent 230 is wicked into the non-woven CNT sheet 120. For example, the solvent 230 has a high surface tension. For example, the solvent 230 comprises one or more of acetone, water, methanol, ethanol, isopropyl, and another solvent.

Figure 2E:
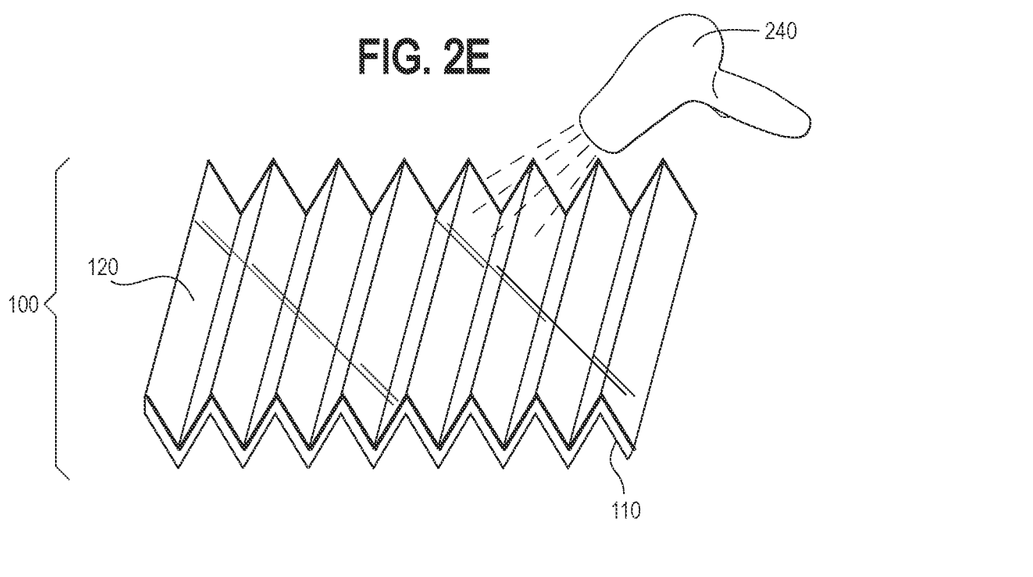

In FIG. 2E, the optical absorber 100 is dried. For example, and as depicted, a dryer 240 dries the optical absorber 100. As the surface layer 120 dries, one or more of surface tension and capillary action of the solvent (not shown in this figure) during the drying process helps do one or more of collapse the surface layer 120, condense the surface layer 120, and draw the surface layer 120 onto the base layer 110. When dried, the surface layer 120 forms a conformal layer 120 on a surface of the base layer 110.

Figure 2F:
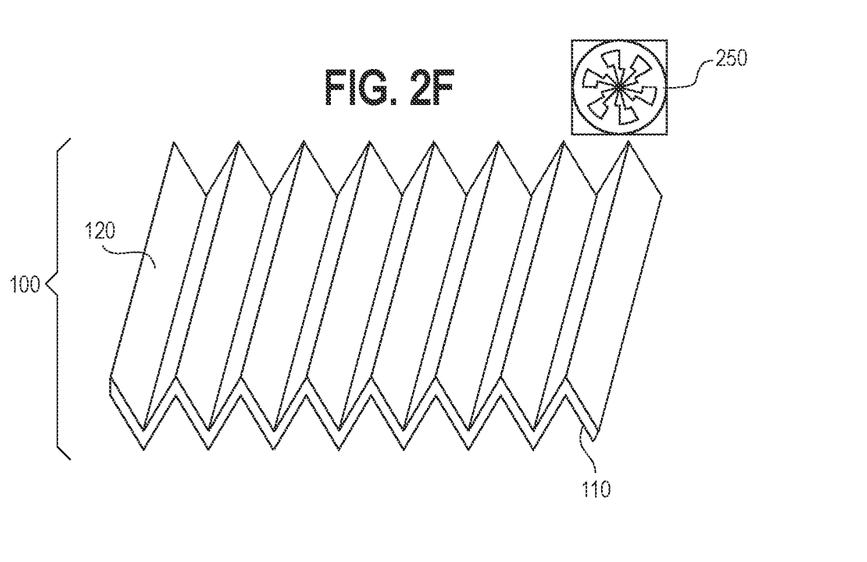

In FIG. 2F, the surface layer 120 is plasma-treated using plasma 250. For example, the surface layer 120 is plasma-treated using oxygen plasma 250. Plasma functionalization may be performed one or more of prior to and subsequent to texturization of the polymer film. The plasma functionalization may be performed one or more of prior to and subsequent to wetting with the solvent of the surface layer 120 comprising the non-woven CNT sheet, creating the high-performance optical absorber 100.

FIGS. 3A-3D are a set of four drawings depicting four different geometries usable in a high-performance optical absorber comprising a texturized base layer, the base layer comprising one or more of a polymer film and a polymer coating, the optical absorber further comprising a surface layer located above and immediately adjacent to the base layer, the surface layer comprising a plasma-functionalized, non-woven carbon nanotube (CNT) sheet.

As shown in FIGS. 3A-3D, various texturization geometries are possible, some of which may provide even lower reflectance than the rectangular texturization depicted in FIGS. 1 and 2A-2E.

Figure 3A:
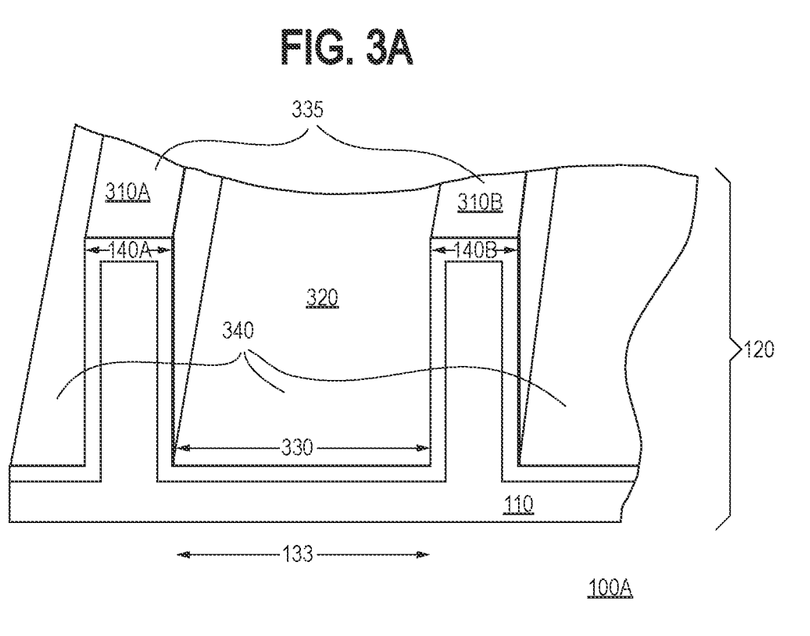
FIGS. 3A-3D are a set of four drawings depicting four different geometries usable in a high-performance optical absorber comprising a texturized base layer, the base layer comprising one or more of a polymer film and a polymer coating, the optical absorber further comprising a surface layer located above and immediately adjacent to the base layer, the surface layer comprising a plasma-functionalized, non-woven CNT sheet.

Depicted in FIG. 3A are the sheet absorber 100A having a rectangular geometry, the sheet absorber 100A comprising the base layer 110 and the surface layer 120, the base layer 110 comprising one or more of a polymer film 110 and a polymer coating 110, the surface layer 120 comprising a non-woven carbon nanotube (CNT) sheet 120. The base layer 110 comprises rectangular-groove texturization. As depicted, the base layer 110 comprises rectangular ridges 310A-310B. Successive rectangular ridges 310A-310B are separated from each other by a pitch 133. The pair of successive rectangular ridges 310A-310B again form between them a rectangular groove 320. The rectangular groove 320 has a rectangular groove width 330. The rectangular ridges 310A-310B each has a respective ridge width 140A-140B. The respective ridge widths 140A-140B are each approximately equal to one third of the groove width 330. Accordingly, a top surface area 335 is approximately equal to one third of a floor surface area 340. Therefore the top surface area 335 is approximately equal to one fourth of the top surface area of non-texturized prior art having a similar shape, and therefore the reflectance of the texturized, functionalized high-performance optical absorber 100 should be reduced to approximately 25% of non-texturized, functionalized prior art having a similar shape.

As an example, the optical absorber 100A comprising the rectangularly-texturized base layer 110 and further comprising the functionalized surface layer 120 as illustrated in FIG. 3A with 3:1 floor-to-top surface area ratio has a reflectance value that is approximately ¼ that of non-textured functionalized CNT and >20× less than non-functionalized CNT sheet. The combined effects of functionalization and texturing together produce optical absorbers 100A with substantially lower optical reflectance properties. Texturization and plasma treatment are substantially independent factors that multiply together mathematically.

Figure 3B:
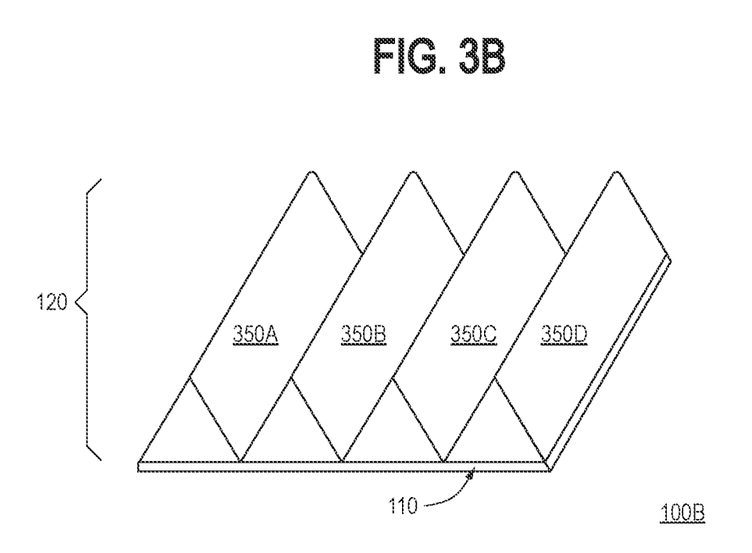

FIG. 3B depicts another optical absorber 100B comprising a base layer 110 having a texturization geometry that comprises triangular ridges 350A-350D, the optical absorber 100B further comprising the functionalized surface layer 120.

Figure 3C:
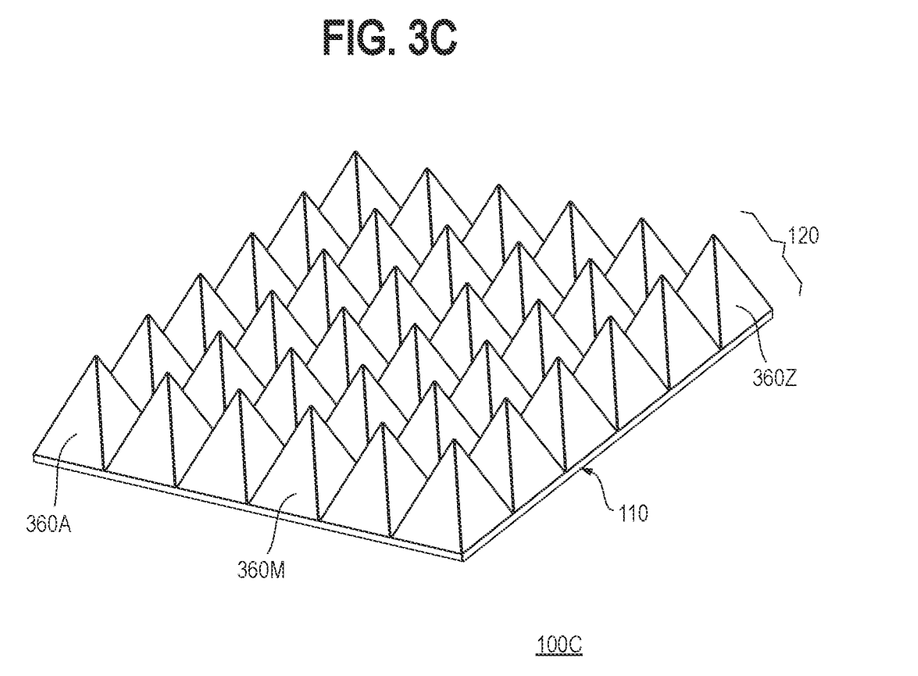

FIG. 3C depicts another optical absorber 100C comprising a base layer 110 having a texturization geometry that comprises pyramidal ridges 360A-360Z, the optical absorber 100B further comprising the functionalized surface layer 120.

Figure 3D:
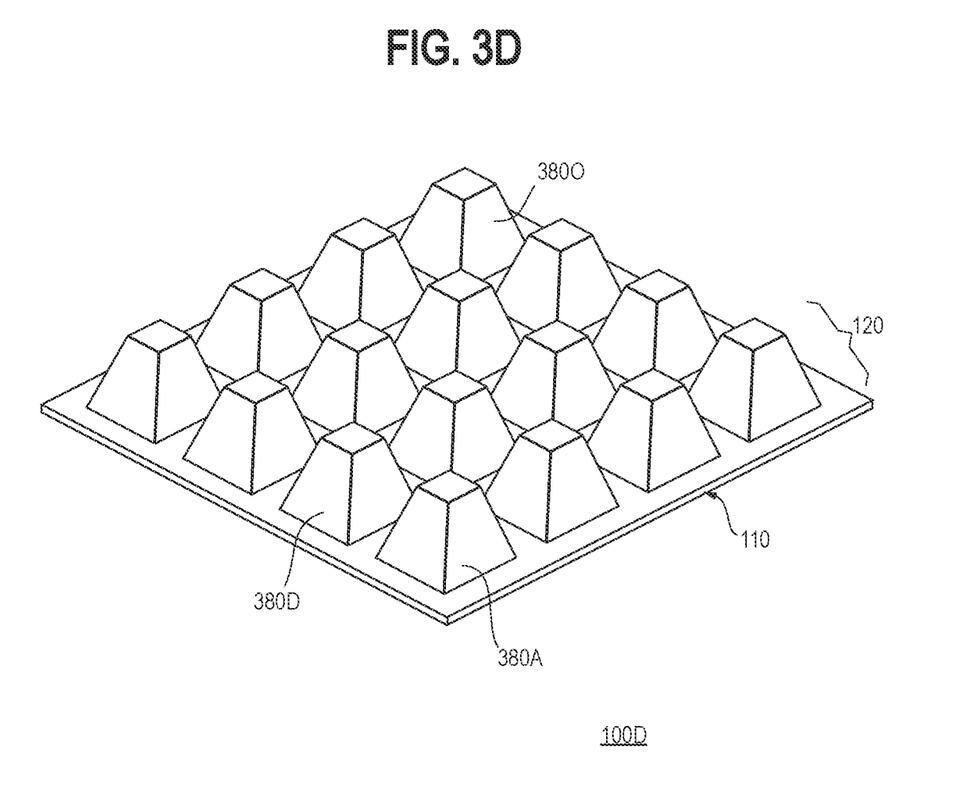

FIG. 3D depicts another optical absorber 100D comprising a base layer 110 having a texturization geometry that comprises truncated pyramidal ridges 380A-380O, the optical absorber 100B further comprising the functionalized surface layer 120.

Figure 4:
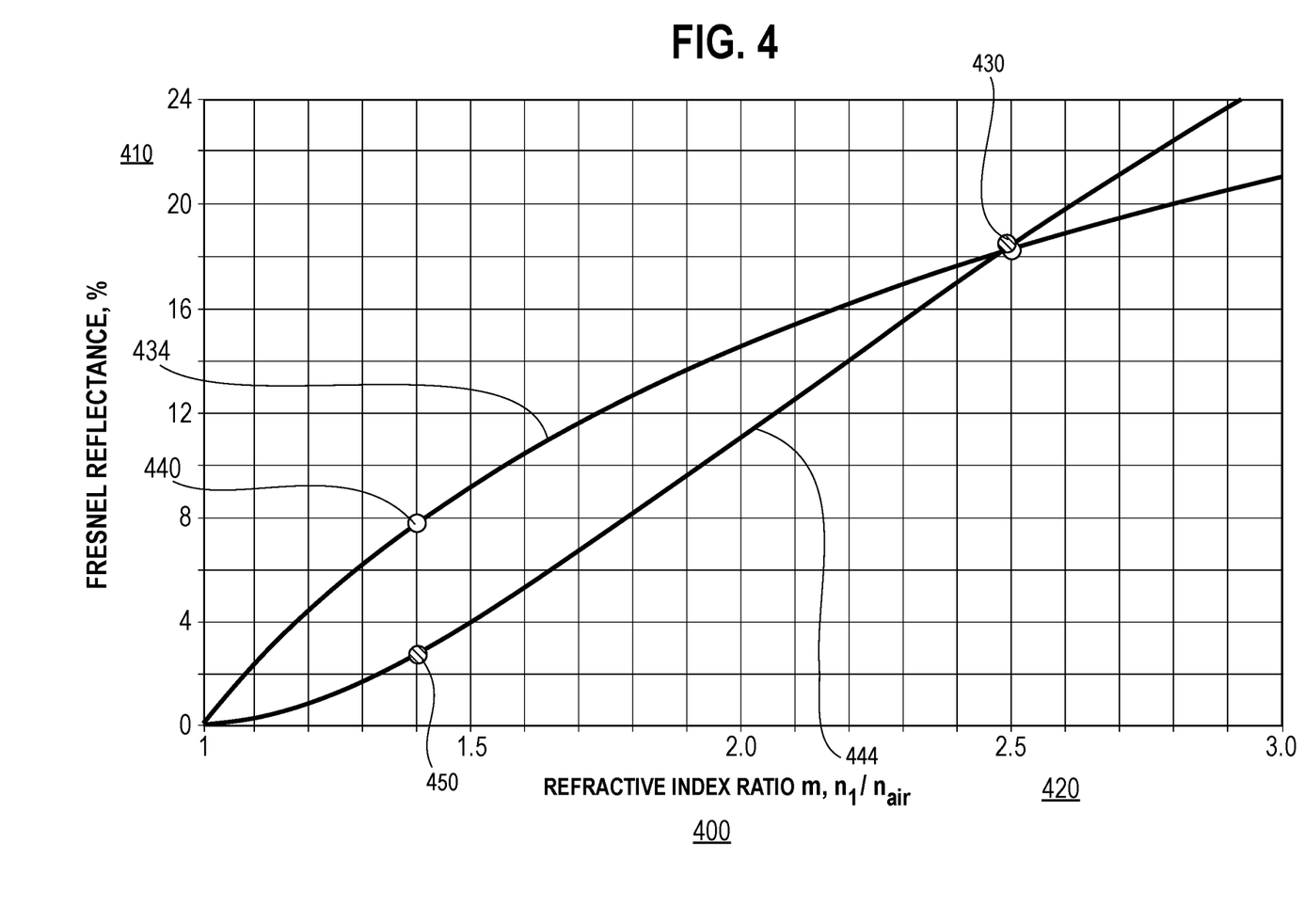
FIG. 4 is a graph of modeling data depicting superior reflectance performance relative to the prior art of a high-performance optical absorber comprising a non-texturized base layer, the base layer comprising one or more of a polymer film and a polymer coating; and a surface layer located above and immediately adjacent to the base layer, the surface layer comprising a plasma-functionalized, non-woven CNT sheet.

FIG. 4 is a graph 400 of modeling data depicting superior absorbance performance relative to the prior art of a high-performance optical absorber comprising a non-texturized base layer, the base layer comprising one or more of a polymer film and a polymer coating, the optical absorber further comprising a surface layer located above and immediately adjacent to the base layer, the surface layer comprising a plasma-functionalized, non-woven CNT sheet.

FIG. 4 depicts a plot of Fresnel reflectance (as a percentage) 410 plotted against a medium refractive index ratio m 420, where $m=n_1/n_{air}$, where $n_1$ is the refractive index of the medium and $n_{air}$ is the refractive index of air. As shown in FIG. 4, the Fresnel reflection is reduced by the inventive high-performance optical absorber from approximately 18% at unoxidized data point 430 to approximately 7.7% for visible light at diffuse incidence (shown as item 434 in the figure) at diffuse incidence data point 440, representing a reduction in reflectance by a factor of approximately 2.4. As also shown in FIG. 4, the Fresnel reflection is reduced by the inventive high-performance optical absorber from approximately 18% at the unoxidized data point 430 to approximately 2.7% for visible light at normal incidence (shown as item 444 in the figure) at normal incidence data point 450, representing a reduction in reflectance by a factor of approximately 6.4. These reflection reductions factors should be approximately valid throughout the visible spectrum up through infrared wavelengths of approximately 1,600 nanometers (nm).

Macro-texturing of the base layer as illustrated in FIG. 1 and FIGS. 3A-3D further reduces the reflectance properties of the sheet material. Texturization is more effective when combined with surface functionalization treatment as outlined in this application. A high-performance optical absorber comprising a texturized base layer, the base layer comprising one or more of a polymer film and a polymer coating, the optical absorber further comprising a surface layer located above and immediately adjacent to the base layer, the surface layer comprising a plasma-functionalized, non-woven CNT sheet.

The high-performance optical absorber comprising a non-texturized base layer, the base layer comprising one or more of a polymer film and a polymer coating, the optical absorber further comprising a surface layer located above and immediately adjacent to the base layer, the surface layer comprising a plasma-functionalized, non-woven CNT sheet, exhibits a hemispherical reflectance less than approximately 0.5-1.5% over the visible spectral range versus 2-8% for prior art non-functionalized material. When texturization is used according to embodiments of the invention in combination with functionalization, reflectance levels can be expected to be further reduced, below half of the reflectance achieved with functionalization but without texturization.

Figure 5:
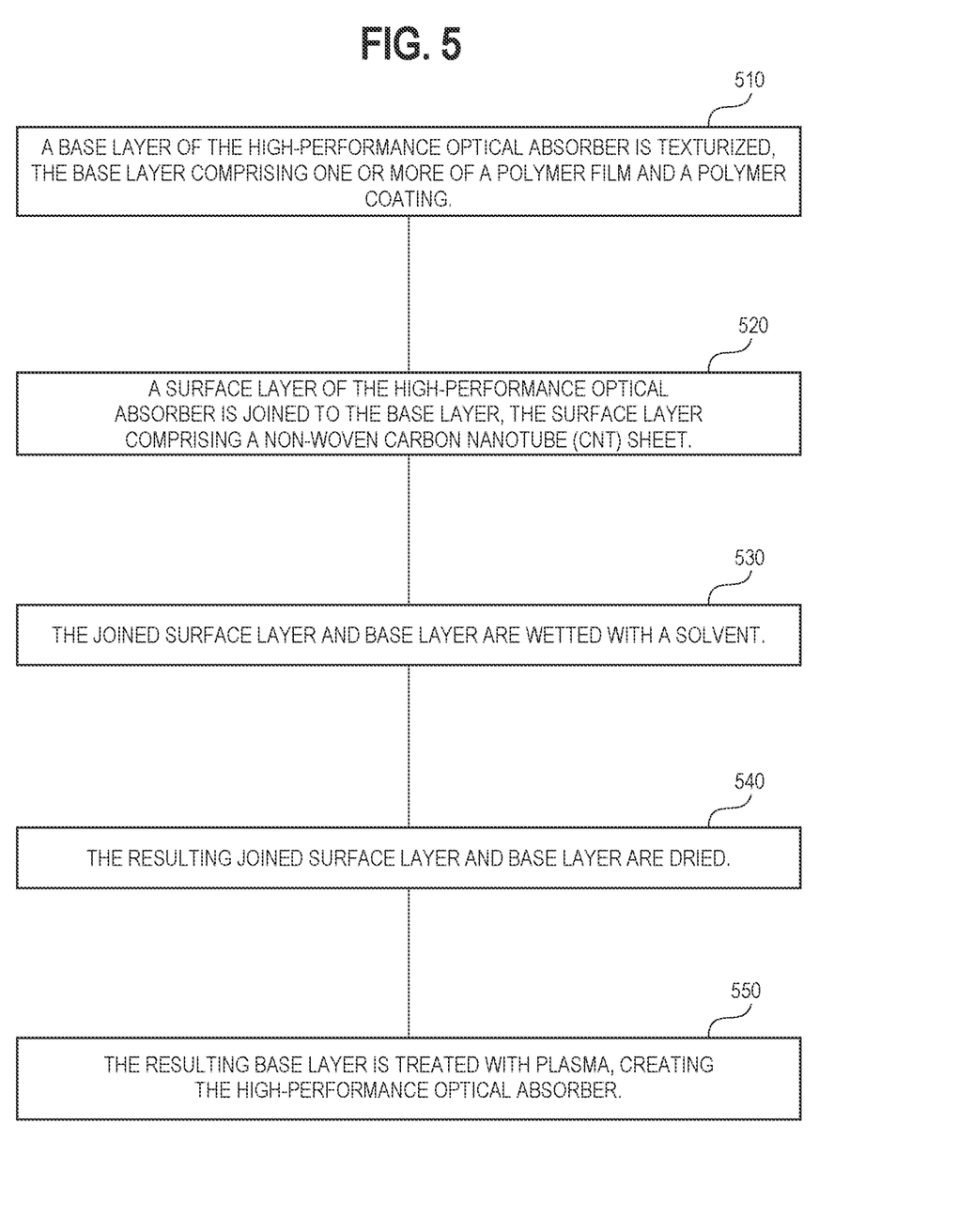
FIG. 5 is a flow chart of a method for manufacturing a high-performance optical absorber.

FIG. 5 is a flow chart of a method 500 using capillary force lamination (CFL) for manufacturing a high-performance optical absorber.

The order of the steps in the method 500 is not constrained to that shown in FIG. 5 or described in the following discussion. Several of the steps could occur in a different order without affecting the final result.

In step 510, a base layer of the high-performance optical absorber is texturized, the base layer comprising one or more of a polymer film and a polymer coating. Block 510 then transfers control to block 520.

In step 520, a surface layer of the high-performance optical absorber is joined to the base layer, the surface layer comprising a non-woven carbon nanotube (CNT) sheet. Block 520 then transfers control to block 530.

In step 530, the joined surface layer and base layer are wetted with a solvent. Block 530 then transfers control to block 540.

In step 540, the resulting joined surface layer and base layer are dried. Block 540 then transfers control to block 550.

In step 550, the resulting base layer is treated with plasma, creating the high-performance optical absorber. The plasma functionalization step 550 may be performed one or more of prior to and subsequent to the wetting step 530. Block 550 then terminates the process.

Figure 6:
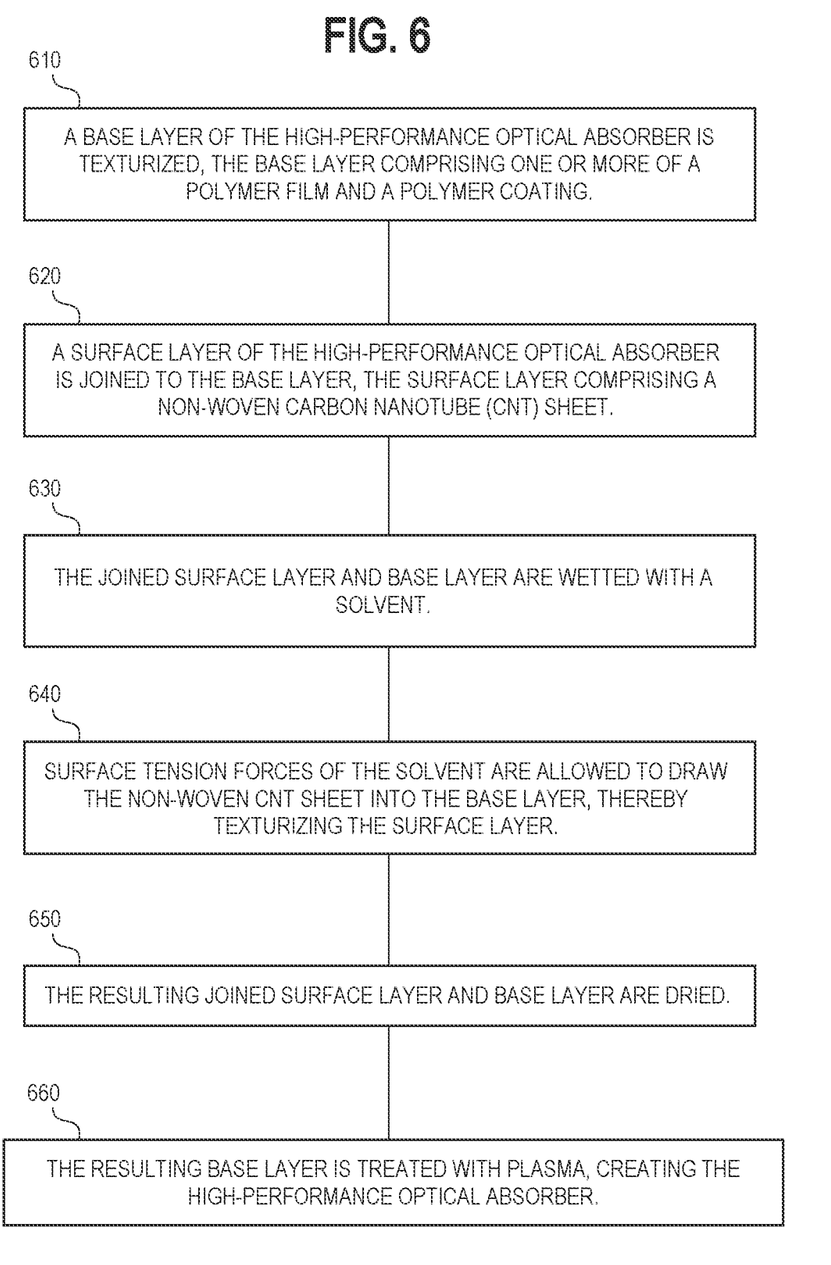
FIG. 6 is a flow chart of a method for manufacturing a high-performance optical absorber.

FIG. 6 is a flow chart of a method 600 using capillary force lamination (CFL) for manufacturing a high-performance optical absorber.

The order of the steps in the method 600 is not constrained to that shown in FIG. 6 or described in the following discussion. Several of the steps could occur in a different order without affecting the final result.

In step 610, a base layer of the high-performance optical absorber is texturized, the base layer comprising one or more of a polymer film and a polymer coating. Block 610 then transfers control to block 620.

In step 620, a surface layer of the high-performance optical absorber is joined to the base layer, the surface layer comprising a non-woven carbon nanotube (CNT) sheet. Block 620 then transfers control to block 630.

In step 630, the joined surface layer and base layer are wetted with a solvent. Block 630 then transfers control to block 640.

In step 640, surface tension forces of the solvent are allowed to draw the non-woven CNT sheet into the base layer, thereby texturizing the surface layer. Block 640 then transfers control to block 650.

In step 650, the resulting joined surface layer and base layer are dried. Block 650 then transfers control to block 660.

In step 660, the resulting base layer is treated with plasma, creating the high-performance optical absorber. The plasma functionalization step 550 may be performed one or more of prior to and subsequent to the wetting step 530. Block 550 then terminates the process.

The plasma functionalization step 660 may be performed one or more of prior to and subsequent to the wetting step 630. Step 660 then terminates the process.

An advantage of embodiments of the invention is that they provide a practical method for producing higher performance optical absorber films and optical absorber coatings for use in aerospace instruments as well as for solar energy conversion applications.

An additional advantage of embodiments of the invention is that combined surface functionalization and texturization treatment of a non-woven CNT sheet creates a dielectric/conductor structure that can have a multiplicative effect in enhancing light absorbance properties of the resulting material. Design of the structure may be tailored depending on details of the texturization. Reduction in Fresnel reflection resulting from the change in refractive index with plasma treatment of the non-woven CNT sheet is substantial.

A further advantage of embodiments of the invention is that embodiments of the invention are physically robust and strong, unlike fragile prior art vertically aligned CNT array (VACNT) materials. A further advantage of embodiments of the invention is they avoid contamination issues present in space applications of the prior art VACNT materials including paint coatings, which do one or more of offgas, flake, and generate light-scattering particulates in telescope applications. A yet additional advantage of embodiments of the invention in that they are usable to coat one or more of internal barrel surfaces and small radius-edged vanes of one or more of telescopes and optical instruments. A further advantage of embodiments of the invention is that relative to the prior art, they can be applied without damaging a surface's optical absorbance properties. A still other advantage of embodiments of the invention is that relative to the prior art, they are suitable for large area coating applications such as applications involving areas of approximately several square meters as well as for applications involving smaller areas. Another advantage of embodiments of the invention is that relative to the prior art, embodiments of the invention employ significantly fewer vanes and/or baffles in optical instrument designs while achieving higher stray light reduction levels. Accordingly, embodiments of the invention avoid attendant prior art disadvantages of one or more of greater complexity, higher weight and higher costs.

A further advantage of embodiments of the invention is that they provide low, omni-directional, Lambertian reflectance that produces substantially uniform reflectance at all angles. According to embodiments of the invention, a refractive index n of the functionalized (and therefore partially oxidized) surface sub-layer is between approximately 1.2 and approximately 1.6, compared to a refractive index for a non-functionalized, non-woven CNT sheet of approximately 2.5.

A further advantage of embodiments of the invention is that a polarization-insensitive absorber is provided. A still additional advantage of embodiments of the invention is that a broadband absorber is provided over a large range of wavelengths from the near-ultraviolet (wavelengths between approximately 250 nm and approximately 400 nm) into the infrared.

Further advantages of embodiments of the invention are that the invention provides robust and easy fabrication not requiring careful calibration of film thickness. A still additional advantage of embodiments of the invention is the absence of a requirement for a vacuum chamber for fabrication of the absorber's film or coating.

A yet further advantage of embodiments of the invention is their relatively high stability, that is, high resistance to changes in reflectivity over time and with exposure to space vacuum. Another advantage of embodiments of the invention is their substantial stability to ultraviolet radiation down to the range of 250-275 nm wavelengths.

As shown in FIG. 4, a further advantage of embodiments of the invention is that relative to the prior art, the invention provides reduced CNT reflectance. The prior art includes one or more of non-woven CNT sheets and buckypapers as manufactured by Nanocomp Technologies, Inc. (www.miralon.com) of Merrimack, N.H., and carbon-loaded black paints such as one or more of Aeroglaze Z306 and Aeroglaze Z307 polyurethane coatings, manufactured by Lord Corporation of Cary, N.C. (www.lord.com). Modeling results conservatively indicate that reflectance of the non-woven CNT sheet produced according to embodiments of the invention may be reduced by a factor of more than twenty times.

A yet other advantage of embodiments of the invention is that the capillary force lamination method can accommodate very large sheets, for example, sheets having approximate dimensions of three feet by three feet and even larger sheets.

Another advantage of embodiments of the invention is that enhanced absorbance of texturized surfaces virtually eliminates secondary and tertiary ray reflection from functionalized groove walls, permitting only reflection from the groove floor of light rays that are nearly normal to the surface.

While the above representative embodiments have been described with certain components in exemplary configurations, it will be understood by one of ordinary skill in the art that other representative embodiments can be implemented using different configurations and/or different components. For example, it will be understood by one of ordinary skill in the art that the order of certain steps and certain components can be altered without substantially impairing the functioning of the invention. It will be further understood by those of skill in the art that the number of variations of embodiments of the invention are virtually limitless. For example, other horizontally-oriented surfaces coated with fibril particles can be used. For example, a texturization geometry could be used in which the ridges vary in one or more of pitch and geometry. For example, a texturization geometry could be used that employ geometries not comprising ridges. For example, a texturization geometry could combine into a single geometry one or more of substantially rectangular ridges, substantially triangular ridges, substantially pyramidal ridges, and truncated, substantially pyramidal ridges. For example, the texturization geometry could combine into a single geometry a varying pitch, in which for example one ridge had a certain pitch of approximately and the adjacent ridge had a pitch of approximately half of that value.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the invention. It is intended, therefore, that the subject matter in the above description shall be interpreted as illustrative and shall not be interpreted in a limiting sense.

We claim:

1. A high-performance optical absorber, comprising:
   a texturized base layer, the base layer comprising one or more of a polymer film and a polymer coating; and
   a surface layer located above and immediately adjacent to the base layer, the surface layer joined to the base layer, the surface layer comprising a plasma-functionalized, non-woven carbon nanotube (CNT) sheet, wherein the base layer texturization comprises one or more of substantially rectangular ridges, substantially triangular ridges, substantially pyramidal ridges, and truncated, substantially pyramidal ridges, wherein the base layer texturization has a pitch that is greater than or equal to $10 \times \lambda$, where $\lambda$ is the wavelength of the incident light.

2. The high-performance optical absorber of claim 1, wherein the surface layer is joined to the base layer by laying the surface layer on the base layer.

3. The high-performance CNT sheet absorber of claim 1, wherein the plasma comprises oxygen plasma.

4. The high-performance CNT sheet absorber of claim 1, wherein the surface layer absorbs a substantial portion of light incident on the surface layer.

5. The high-performance CNT sheet absorber of claim 1, wherein the surface layer comprises multi-walled CNTs (MWCNTs).

6. The high-performance CNT sheet absorber of claim 1, wherein the base layer texturization has a pitch that is greater than or equal to $10 \times \lambda$.

7. The high-performance CNT sheet absorber of claim 1, wherein the CNT sheet has a thickness greater than or equal to $10 \times \lambda$.

8. The high-performance CNT sheet absorber of claim 1, wherein the base layer has a height above the surface layer greater than or equal to $10 \times \lambda$.

9. The high-performance optical absorber of claim 1, wherein the texturized base layer is texturized using one or more of embossing, engraving, and three-dimensional printing.

10. The high-performance optical absorber of claim 1, wherein the CNT sheet comprises horizontal, randomly-oriented CNT.

11. The high-performance optical absorber of claim 1, wherein the base layer texturization comprises substantially rectangular ridges, and wherein each successive pair of the rectangular ridges form between them a rectangular groove.

12. The high-performance optical absorber of claim 10, further comprising a plurality of rectangular grooves, and wherein the rectangular grooves create respective floors.

* * * * *